Figure 1:
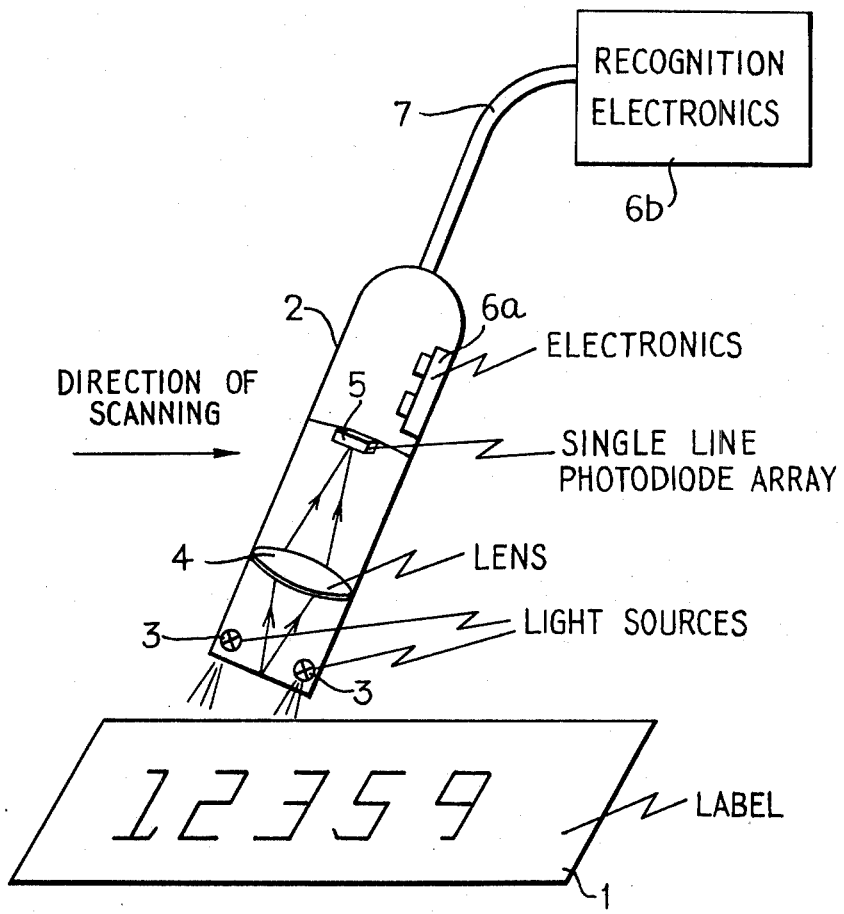

United States Patent [19]
Whitfield et al.

[11] 4,056,804
[45] Nov. 1, 1977

[54] OPTICAL CHARACTER RECOGNITION SYSTEMS

[75] Inventors: John Alan Whitfield, Wimborne; Eric William Burdis, Poole, both of England

[73] Assignee: Piessey Handel und Investments A.G., Zug, Switzerland

[21] Appl. No.: 722,132

[22] Filed: Sept. 10, 1976

[30] Foreign Application Priority Data

Sept. 11, 1975 United Kingdom ............ 37346/75

[51] Int. Cl.$^2$ ............................................. G06K 9/00
[52] U.S. Cl. .................... 340/146.3 J; 340/146.3 SY
[58] Field of Search ................ 340/146.3 J, 146.3 C, 340/146.3 SY, 146.3 MA; 235/61.11 E

[56] References Cited

U.S. PATENT DOCUMENTS

| | | | |
|---|---|---|---|
| 3,519,991 | 7/1970 | Kobayashi | 340/146.3 J |
| 3,593,287 | 7/1971 | Kobayashi et al. | 340/146.3 J |
| 3,603,930 | 9/1971 | Britt | 340/146.3 J |
| 3,883,848 | 5/1975 | Minck et al. | 340/146.3 J |
| 3,964,022 | 6/1976 | Martin | 340/146.3 J |

*Primary Examiner*—Leo H. Boudreau
*Attorney, Agent, or Firm*—Fleit & Jacobson

[57] ABSTRACT

An optical character recognition system comprising a reader head which includes the single line array of photo-sensitive elements, a clock pulse generator under control of which the elements of the array are sequentially sampled to produce video output pulses one from each element, the level of each pulse being dependent upon the light incident upon the element from which it originated, all elements being sampled in one scan and the elements being scanned repeatedly, data storage means into which the output pulses derived from the array are clocked under control of the clock pulse generator, a feature detector comprising gating circuits responsive to predetermined signals obtaining contemporaneously in two or more predetermined locations within the store for providing a signal indicating that a feature has been detected, a plurality of different features being detectable, each being regarded as havng a certain priority relative to the others, priority selection gating means operative for selecting the feature having the highest priority detected in each scan, minimization logic circuitry responsive to signals fed from the priority selector gating means and having a plurality of output lines one for each feature, on an appropriate one of which a signal is produced each time the highest priority feature selected in a given scan differs from the feature having the highest priority selected in the previous scan, a plurality of feature stores one for each feature which are individually fed on an appropriate line from the minimization logic circuitry and clocked synchronously by incoming signals fed on the said appropriate lines so as to advance in synchronism data clocked into the feature stores, and a character recognition logic circuit responsive to the signals in the feature stores for providing an output signal indicating that a character has been recognized when predetermined features occur in a predetermined sequence within the feature stores.

10 Claims, 3 Drawing Figures

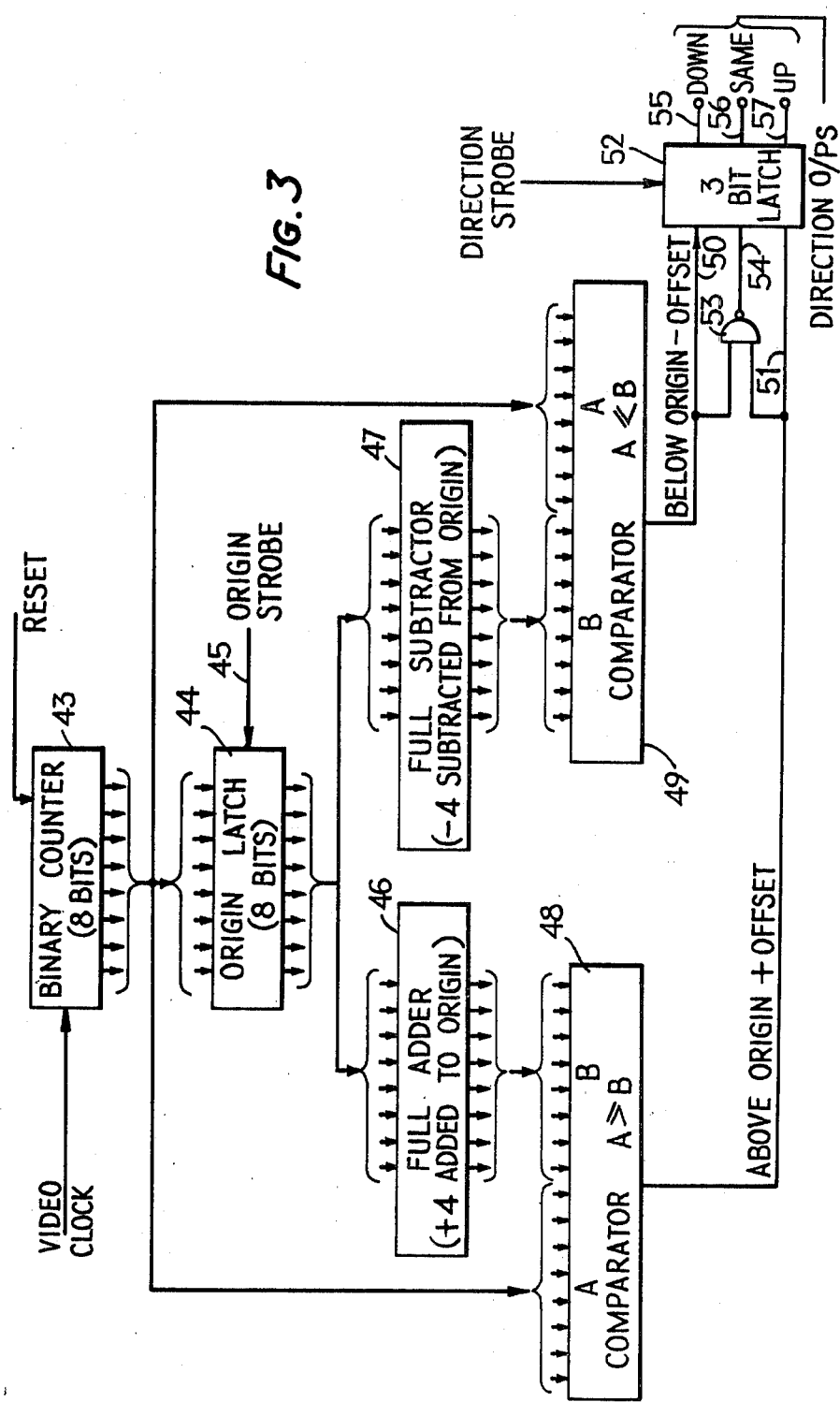

OPTICAL CHARACTER RECOGNITION SYSTEMS

This invention relates to optical character recognition OCR systems and more especially it relates to such systems which include a head for scanning characters to be recognised which is incorporated in a housing adapted to be held in the hand.

Present data capture systems for use in supermarkets, warehouses and libraries etc. are based on manual data entry via a keyboard, or based on automatic entry via devices such as the Plessey Data Pen which utilises a data pen or probe and which is adapted to read data in the form of bar-coded labels. The use of a data pen or probe which is scanned across the bar-coded labels is obviously a great improvement over manual entry and results in faster operation with fewer errors. Unfortunately bar-codes are not easily read by humans and this necessitates printing a corresponding label beneath or in association with the bar-code. In addition, bar-codes require to be printed to close tolerances and this in itself can be costly.

OCR systems utilising a hand held probe are known which include two dimensional photo sensitive arrays, and the use of a two dimensional array simplifies to some extent the recognition problem but at the same time is costly since such arrays are inevitably expensive. One object of the present invention is to produce a system including a relatively low cost hand held device for reading characters produced in fairly good quality print of the OCR 'A' font type or similar fonts.

According to the present invention an OCR system comprises a reader head which includes a single line array of photo sensitive elements, a clock pulse generator under control of which the elements of the array are sequentially sampled to produce video output pulses one from each element, the level of each pulse being dependent upon the light incident upon the element from which it originated, all elements being sampled in one scan and the elements being scanned repeatedly, data storage means into which the output pulses derived from the array are clocked under control of the clock pulse generator, a feature detector comprising gating circuits responsive to predetermined signals obtaining contemporaneously in two or more predetermined locations within the store for providing a signal indicating that a feature has been detected, a plurality of different features being detectable, each being regarded as having a certain priority relative to the others, priority selection gating means operative for selecting the feature having the highest priority detected in each scan, minimisation logic circuitry responsive to signals fed from the priority selector gating means and having a plurality of output lines one for each feature, on an appropriate one of which a signal is produced each time the highest priority feature selected in a given scan differs from the feature having the highest priority selected in the previous scan, a plurality of feature storage locations one for each detected feature which are individually fed on an appropriate line from the minimisation logic circuitry and clocked synchronously by incoming signals fed on the said appropriate lines so as to advance in synchronism data clocked into the feature stores, and a character recognition logic circuit responsive to the signals in the feature stores for providing an output signal indicating that a character has been recognised when predetermined features occur in a predetermined sequence within the feature stores.

The data storage means may comprise a multistage series coupled shift register and the feature stores may each comprise self clocking multistage serially coupled shift registers which are clocked by incoming data rather than clock pulse signals so as to advance data entered therein mutually in synchronism.

In order to read a character or characters with an OCR system according to the present invention, relative movement is produced between the characters and the array, the characters being so positioned relative to the array that light reflected from the characters is incident on the array.

The invention is especially concerned with a system in which the array is carried in a housing which is adapted to be held in the hand; and in this embodiment of the invention the array would be moved relative to the characters and the housing may include a lens system for focussing an image of the characters to be read on to the photo sensitive array.

Since the array is defined by a line of photo sensitive elements such as photo-diodes and the direction of scan for character reading purposes is generally orthogonal to the longitudinal axis of the array, it will be apparent that if the array is skewed significantly from this preferred orthogonal orientation in which the longitudinal axis of the array is orthogonal to the scanned direction, then the sequence of features detected may differ from the sequence which would be expected with the preferred orientation. In order to obviate the effects of skew so that limited degrees of skew can be tolerated and will not affect reading accuracy, it may be arranged that the minimisation logic circuitry is responsive to a predetermined sequence of features produced due to skew received from the priority selection gating means for initiating a cancellation function whereby spurious ones of the predetermined sequence of features are erased from the feature store or stores so as to retain only the wanted correct feature which would have been recognised if skew had not been in evidence. This arrangement which improves the reading efficiency of the system in the presence of skew is fully described hereinafter.

A further source of reading confusion could arise when characters are required to be recognised which produce the same sequence of features when scanned by the array. Such characters, such as the OCR 'A' font characters 2 and 5, are discussed hereinafter in detail. In order to obviate this confusion, the system may comprise three additional stores connected in effect as additional feature stores and comparator means for comparing the position of the origin within the data storage means of the first significant feature to be detected in each character with the position of the origin of subsequently detected features of the character, and in dependence upon the results of such comparison, stepping on, or injecting data into, one or other of the three additional stores in accordance with whether the origin of the subsequently detected feature is "the same as", "up on", or "down on", the origin of the first significant feature to be detected, one of the additional stores being used to store data appertaining to each of the three functions "the same as" "up on" and "down on".

Most conveniently the additional stores may be similar in construction to the feature stores and may comprise multistage self clocking shift registers which are clocked, mutually in synchronism with the shift registers which comprise the feature stores.

The comparator means may comprise a counter arranged to receive pulses derived from the clock pulse generator, to count up during each scan and to be reset at the end of each scan, a count storage latch which is responsive to the counter for storing the count state of the counter when the first significant feature of a character is detected, an adder which adds a weighting count on to the stored count and presents the sum count thereof at output terminals and a subtractor which subtracts a weighting count from the stored count and presents a difference count on further output terminals, a first comparator which compares in subsequent scans the count state of the counter with the stored sum count in the adder, a second comparator which compares in subsequent scans the count state of the counter with the stored difference count in the subtractor and gating means responsive to the output from the comparators for providing on one or other of three lines a signal to one or other of the three additional stores indicative of whether a feature selected subsequently to the first feature originates in the data store at a location which is "the same as", "up on" or "down on", the origin of the location of the first feature, data from the three additional shift registers being sampled by the character recognition logic circuit whereby recognition of a character having the same sequence of features as another different character is facilitated.

Figure 2:
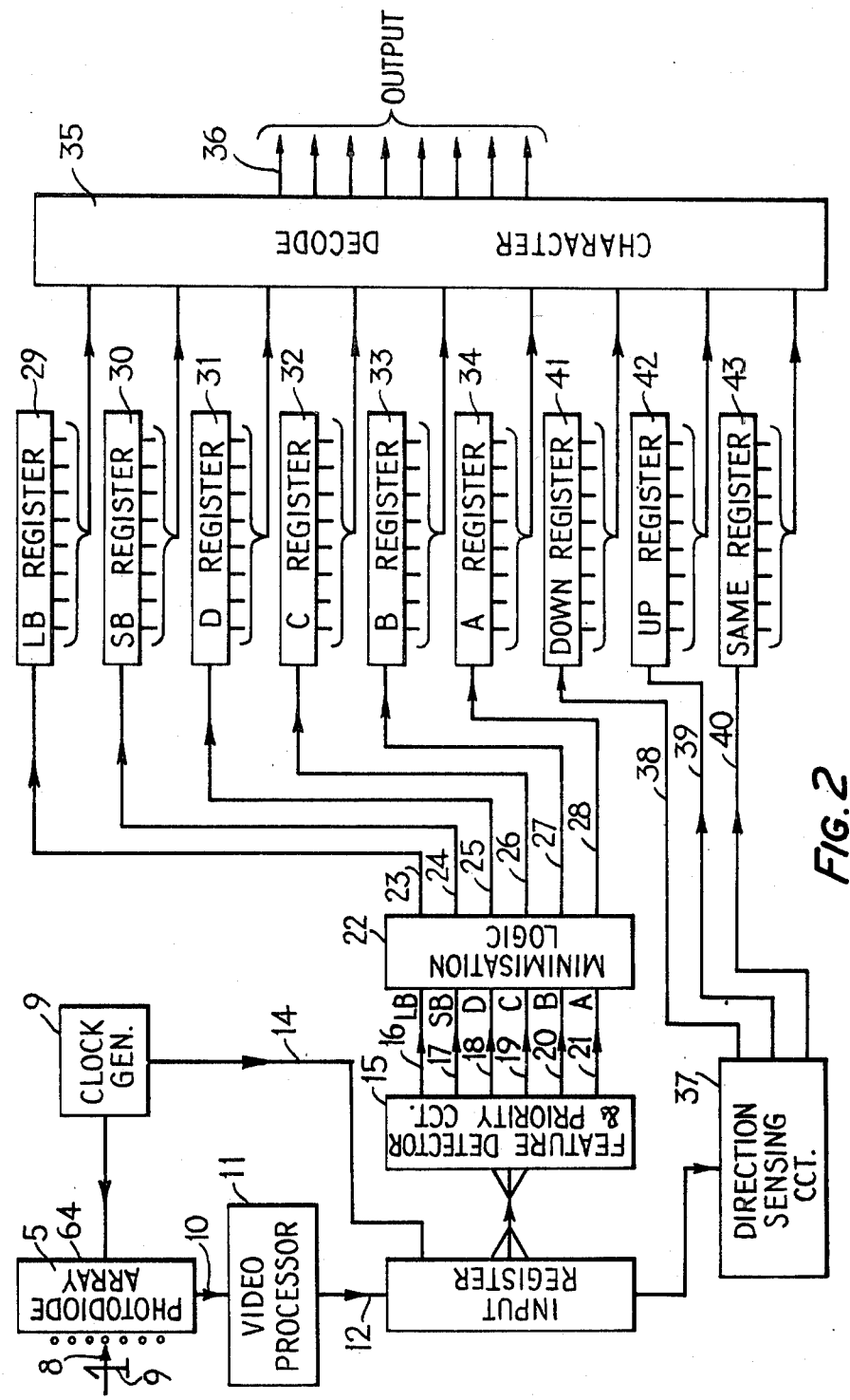

Some exemplary embodiments of the invention will now be described with reference to the accompanying drawings in which:

FIG. 1 is a block schematic diagram showing a housing which is adapted to be held in the hand and which includes a read head for scanning OCR 'A' font characters, FIG. 2 is a generally schematic block diagram showing the circuitry in block schematic form necessary for recognising a character scanned, and FIG. 3 is a block schematic diagram of the direction sensing circuits which form a part of the diagram shown in FIG. 2.

Referring now to FIG. 1, a label 1 is shown which bears stylised characters of the OCR 'A' font which are required to be read by means of an OCR system. The system includes a pen or probe 2 which is adapted to be held in the hand and which includes light sources 3 for illuminating data to be scanned and a lens 4 for focussing light reflected from the data to be scanned on to a single line photodiode array 5. The signals produced by the array as the probe 2 is scanned across the data are processed by electronic circuitry 6a, 6b the part of which 6a is enclosed within a housing of the pen and the part of which 6b is stored remotely from the pen and connected to the pen by means of a lead 7.

The electronic circuitry is shown in block schematic form in FIG. 2 and the photodiode array 5 is moved for scanning purposes in the direction of the arrow 8 across a character which is oriented as indicated by the FIG. 1 which is designated 9 and shown in FIG. 2. The photodiode array 5 comprises a single line of 64 photodiodes arranged side by side along the length of the array. The diodes are individually sampled under control of signals from a clock pulse generator 9 which runs at about 300 kc's so that the diodes of the array 5 are sampled sequentially. Output signals from the photodiode array which comprise discrete pulses each originating from a separate photodiode are fed on line 10 to video processing circuitry 11 which simply comprises a wave shaper which serves to square up the video waveform from the photodiodes. Output signals from the video processor are fed sequentially on line 12 into an input shift register 13. The input register 13 is clocked synchronously with the photodiode array by means of pulses fed on line 14 from the clock pulse generator 9. The number of stages provided in the input shift register must be sufficient to store a strip of data covering a full character height, and in the present case a 24-stage shift register is provided.

The various stages of the input shift register are obviously serially connected and they are monitored by feature detection circuitry 15 which is responsive to the occurrence of data in predetermined stages of the shift register 13 for detecting a feature. The feature detection circuitry 15 may be constructed using well known gating circuitry such as, AND gates, flip-flops, or NAND gates. In the present system six features are arranged to be detected and these are designated as follows:

LB — This is the long vertical limb which occurs in the following characters, 0, 1, 4, 6 and 9.

SB — This is the short vertical limb which occurs in the following characters, 1, 2 and 5.

D — This is the three horizontal limbs which occur in the following characters, 2, 5 and 8.

C — This is the two horizontal limbs which occur in a 0 or a 1; and

B — This is the two closely spaced horizontal limbs which occur in a 6 or a 9; and finally A — Which is the single horizontal limb which occurs in 1, 4 or 7. (When characters are referred to herein they are OCR 'A' font characters or the like).

The features are accorded a priority such that LB is regarded as having the highest priority and A is regarded as having the lowest priority, the other features having priorities of descending order in the order just before described, i.e. LB has the highest priority and they follow SB, D, C, B and A in descending order of priority.

The feature detector as well as detecting features occurring in the input shift register also includes priority gating selection circuitry whereby only the feature having the highest priority detected in each scan is fed to one of the output lines 16, 17, 18, 19, 20 and 21 which appertain to the detection of the features LB, SB, D, C, B or A respectively. Priority selection is necessary since it will be apparent that when, for example, a D, feature is in the input shift register 13, then in the same line scan other features B and A will be detected, but due to the operation of the priority selecting gating circuitry in that scan only the feature D will be detected and result in an output signal on line 18. The gating circuitry used to construct the priority selecting circuit may consist of OR gates and NOR gates connected such that the highest priority line will have its output fed through a NOR gate along with that of the next successive priority line, thereby blocking all signals except the highest priority signal at each NOR decisional. Output signals on the lines 16 through 21 are fed to minimisation logic circuitry 22 which has six corresponding output lines 23, 24, 25, 26, 27 and 28 on which signals are fed corresponding to the features LB, SB, D, C, B and A respectively.

The minimisation logic circuitry performs two functions, although both functions are directed at the purpose of removing or ignoring redundant information and hence serve to reduce storage requirements. The first function is to provide an output signal only when there is a change in the feature detected. This is necessary because it will be clear that the same feature may be detected in successive scans and while the same feature is being repeatedly detected the output signal on the lines 23 to 28 does not change. As soon as a fresh feature is detected however, then a fresh output signal will be fed to one of the lines 23 to 28. This function may be easily achieved by the use of a conventional flip-flop and NAND gate in which both the flip-flop output and input are fed to the NAND gate. The NAND gate output will then be high if another input signal is presented which is identical to the previous input signal. The second operation performed by the minimisation logic circuit is concerned with obviating the effects of skew produced due to the scanning of a character with the photodiode array skewed from a preferred position at which it is orthogonal to the longitudinal axis of the character. The operation and effect of this further circuit function contained in the minimisation logic circuitry 22 will later be discussed.

Signals from the minimisation logic circuitry on lines 23 through 28 are fed to shift registers 29 through 34, one of which is provided for each feature LB, SB, D, C, B and A. When data indicating the detection of a feature is received on one of the lines 23 to 28 it is entered into the appropriate one of the shift registers 29 to 34 and all shift registers are stepped on so that the shift registers operate in a mutually synchronised condition and are self clocking. That is to say each time a data element is received by one shift register, all the other shift registers step on and the operation of the shift registers is only effected by the reception of data and is independent of a clock pulse generator. The various stages of the shift registers 29 through 34 are monitored by a decode logic character recognition decoder circuit 35 and when a predetermined sequence of features is detected by the decoder circuit 35, an appropriate output signal is given in one or other of the output lines 36 to indicate that a particular character has been recognised.

For example when the character 1 is scanned, the decode logic circuitry 35 is responsive to the sequential occurrence in the registers 29 through 34 of the features C, LB, A and SB and when the character 2 is detected the features SB, D and SB are sequentially stored, whereas when the character 6 is detected, the features LB, B and SB are sequentially stored and detected for character recognition purposes.

However if during the scanning operation the photodiode array 5 is skewed from the preferred position whereat it is truly orthogonal to the longitudinal axis of the character, then certain spurious features will be additionally detected. For example, if the character 1 is scanned with the skewed array, then the following features might be detected, A, C, SB, LB, SB, A, SB, A. In order to overcome this problem, A is considered an insignificant feature and is ignored and the sequences SB, LB or LB, SB are considered to be equivalent to LB alone and so the feature SB in these sequences is erased from the register. Circuitry for performing this operation whereby the effects of skew are minimised is provided in the minimisation logic circuitry 22 as just before mentioned.

A further problem which may arise is discriminating between two characters such as the character 2 or the character 5 both of which when scanned produce the sequence of features SB, D, SB. In order to discriminate between these characters, direction sensing circuitry 37 is provided feeding on lines 38, 39 and 40, three additional shift registers 41, 42 and 43 which contain information appertaining to the origin of a feature with respect to the origin within the input register 13 of a feature with respect to the origin within the input register 13 of the first feature of a character to be detected. The registers 41, 42 and 43 are similar to the registers 29 to 34 having the same number of stages and being self clocking serially coupled multi-stage shift registers which step mutually in synchronism with each other when data is fed into one register. Thus when a feature is detected and indicated by data being stepped into one of the registers 29 to 34, there will also be data stepped into one or other of the registers 41 to 43 in dependence upon whether that feature, is as regards its origin, "the same as", "up on" or "down on" the origin of the first feature detected in a character. This additional information is fed into the character decode logic circuit 35 to facilitate discrimination between characters such as 2 and 5 to provide a more comprehensive reading system.

For example when the character 2 is scanned, the following features are detected: SB and 'same', D and 'same' since the origin of D was the same as the origin of SB, and SB 'up', since the origin of the second SB was above the origin of the first SB, and for 5 we have, SB 'same', D 'down' since the origin of the feature D is down on SB, and SB 'down' since the origin of the second SB feature is down on the first SB feature. It will be also appreciated from the foregoing that the priority selection circuitry ignores the feature A which would be detected with SB as 2 or 5 is scanned.

The direction sensing circuitry is shown in more detail in FIG. 3 and comprises a binary counter 43 which is arranged to start counting clock pulses at the beginning of each scan of the photodiode array 5. When a feature is detected a store latch 44 is strobed on line 45 to store the count state of the counter so as to indicate the point of origin of the feature within the input register 13. To allow for hysteresis a weighting count stored in an adder 46 is added to the count and the count reduced by four in a subtractor, so as to provide two reference limit counts. These two reference counts are then compared in comparators 48 and 49 with the state of the binary counter 43 and the outputs from the counters 48 and 49 are fed on lines 50 and 51 to a strobed latch 52. The lines 50 and 51 are also connected via an NOR gate 53 to a further input on line 54 to the strobe latch 52. Thus a signal is provided on line 50 when the state of the counter 43 is below the lower reference count and a signal is provide on a line 51 when the state of the counter 43 is equal to or greater than the upper reference count. When signals are not present on both lines the gate 53 is operated and a signal is present on line 54. As each feature is detected, the latch 52 is strobed and an output signal is provided on one or other of the lines 55, 56 or 57 as appropriate which correspond to the lines 38, 39 and 40 as shown in FIG. 2 and which feed the "down", "up" or "same" register 41, 42 or 43 respectively.

Various modifications may be made to the arrangement just before described without departing from the scope of the invention and for example different sampling stores may be used to the shift register shown in the drawing and any suitable logic circuits may be utilised to produce the functions specified. The feature stores constituted by shift registers 29 to 43 may be replaced by a R.A.M (random access memory) fed with a coded signal indicative of the detected feature. Similarly the character decode recognition logic circuit 35 may be a proprietary microprocessor.

What we claim is:

1. An optical character recognition system comprising a reader head which includes a single line array of photo sensitive elements, a clock pulse generator under control of which the elements of the array are sequentially sampled to produce video output pulses one from each element, the level of each pulse being dependent upon the light incident upon the element from which it originated, all elements being sampled in one scan and the elements being scanned repeatedly, data storage means into which the output pulses derived from the array are clocked under control of the clock pulse generator, a feature detector comprising gating circuits responsive to predetermined signals obtaining contemporaneously in two or more predetermined locations within the store for providing a signal indicating that a feature has been detected, a plurality of different features being detectable, each being regarded as having a certain priority relative to the others, priority selection gating means operative for selecting the feature having the highest priority detected in each scan, minimisation logic circuitry responsive to signals fed from the priority selection gating means and having a plurality of output lines one for each feature on an appropriate one of which a signal is produced each time the highest priority feature selected in the given scan differs from the feature having the highest priority selected in the previous scan, a plurality of feature storage locations one for each detected feature which are individually fed on an appropriate line from the minimisation logic circuitry and clocked synchronously by incoming signals fed on the said appropriate line so as to advance in synchronism data clocked into the feature stores, and a character recognition logic circuit responsive to the signals in the feature stores for providing an output signal indicating that a character has been recognised when predetermined features occur in a predetermined sequence within the feature stores.

2. An optical character recognition system as claimed in claim 1 wherein the data storage means comprises a multistage series coupled shift register and the feature stores each comprise self clocking multistage series coupled shift registers which are clocked by incoming data so as to advance data entered therein mutually in synchronism.

3. An optical character recognition system as claimed in claim 2 wherein in use of the system relative movement is produced between the characters and the array, the characters being so positioned and arranged relative to the array that light reflected from the characters is incident on the array.

4. An optical character recognition system as claimed in claim 3 wherein the array is carried in a housing which is adapted to be held in the hand whereby the array is moved relative to the characters.

5. An optical character recognition system as claimed in claim 4 wherein the housing includes a lens system for focussing an image of characters to be read onto the photo sensitive array.

6. An optical character recognition system as claimed in claim 5 wherein the minimisation logic circuitry is arranged to be responsive to a predetermined sequence of features produced from the priority selection gating means for initiating a cancellation function whereby spurious ones of the predetermined sequence of features are erased from the feature store or stores so as to retain therein only the wanted correct feature which would have been recognised if spurious effects had not been in evidence.

7. An optical character recognition system as claimed in claim 6 wherein the system comprises three additional stores connected in effect as additional feature stores and comparator means for comparing the position of the origin within the data storage means of the first significant feature to be detected in each character with the position of the origin of subsequently detected features of the character and in dependence upon the results of such comparison, stepping on or injecting data into one or other of the three additional stores in accordance with whether the origin of the subsequently detected feature is "the same as", "up on" or "down on" the origin of the first significant features to be detected one of the additional stores being used to store data appertaining to each of the three functions "the same as", "up on" and "down on".

8. An optical character recognition system as claimed in claim 7 wherein the additional stores are similar in construction to the feature stores.

9. An optical character recognition system as claimed in claim 8 wherein the additional stores and the feature stores comprise multistage self clocking shift registers which are clocked mutually in synchronism with the shift registers which comprise the feature stores.

10. An optical character recognition system as claimed in claim 9, wherein the comparator means comprises a counter arranged to receive pulses received from the clock pulse generator to count up during each scan and to be reset at the end of each scan, a count storage latch which is responsive to the counter for storing the count state of the counter when the first significant feature of a character is detected, an adder which adds a weighting count onto the stored count and presents the sum count thereof at output terminals, and a subtractor which subtracts a weighting count from the stored count and presents a difference count on further output terminals, a first comparator which compares in subsequent scans the count state of the counter with the stored sum count in the adder, a second comparator which compares in subsequent scans the count state of the counter with the difference count in the subtractor and gating means responsive to the output from the comparators for providing on one or other of three lines a signal to one or other of the three additional stores indicative of whether a feature selected subsequently to the first feature originates in the data store at a location which is "the same as", "up on" or "down on", the origin of the location of the first feature, data from the three additional shift registers being sampled by the character recognition logic circuit whereby recognition of the character having the same sequence of features as another different character is facilitated.

* * * * *